May 1, 1945.   B. S. BIGGS ET AL   2,374,973
NITRO-DICHLORO-XYLENE COMPOSITIONS
Filed June 28, 1941
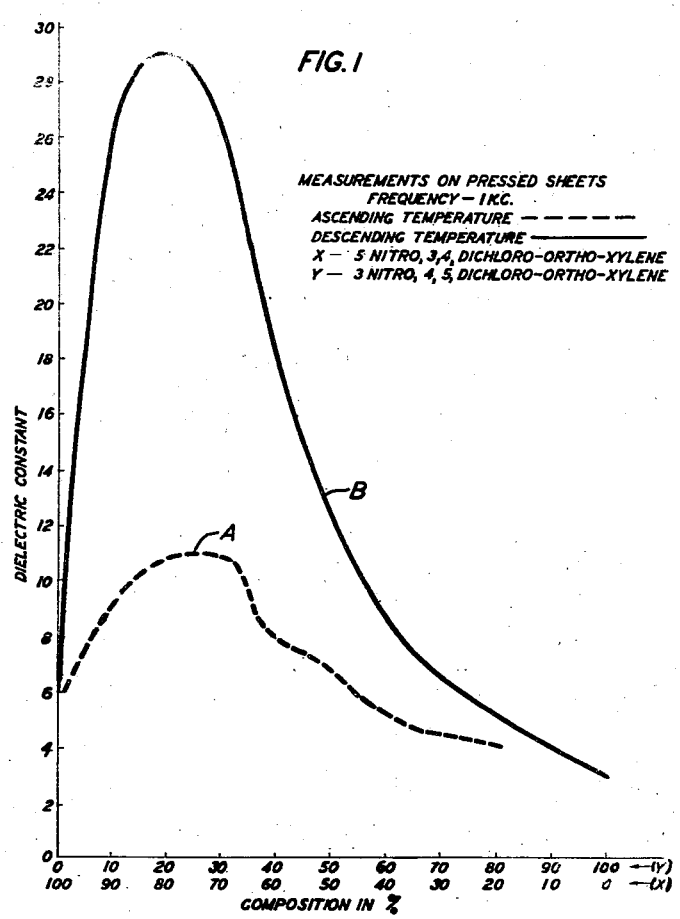
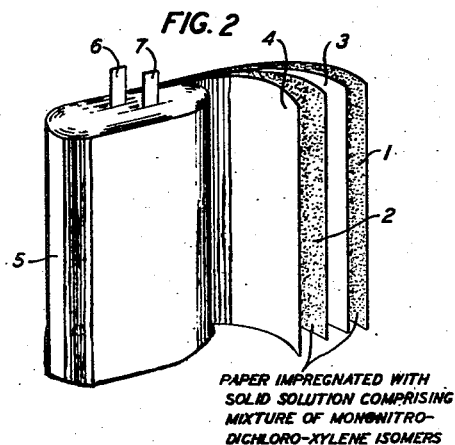
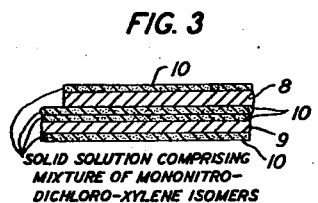
INVENTORS B. S. BIGGS
A. H. WHITE
W. A. YAGER
BY
ATTORNEY Patented May 1, 1945

2,374,973

UNITED STATES PATENT OFFICE 2,374,973

NITRO-DICHLORO-XYLENE COMPOSITIONS

Burnard S. Biggs and Addison H. White, Summit, and William A. Yager, Murray Hill, N. J., assignors to Bell Telephone Laboratories, Incorporated, New York, N. Y., a corporation of New York Application June 28, 1941, Serial No. 400,288

16 Claims. (Cl. 175—41)

This invention relates to materials having advantageous dielectric properties and to apparatus embodying such materials. More particularly, the invention relates to dielectric materials having high dielectric constants and physical and other characteristics rendering them advantageous for use in electrical condensers, and to condensers embodying such dielectric materials.

Electrical condensers to which the present invention relates comprise spaced metallic armatures constituting the plates of the condenser separated by a layer formed of one or more dielectric materials. The condensers in general are of two types, the rolled type and the stacked type. In the rolled type of condenser the metallic armatures and the separating dielectric layers are wound into a suitable roll; in the stacked type the armatures and dielectric layers are flat and are disposed in alternate relationship. In most cases the dielectric layers comprise suitable spacers, usually of one or more sheets of paper or fabric in each layer, impregnated with a suitable dielectric material. The dielectric material of the present invention may be employed with such condensers either with or without such spacers.

The dielectric materials of the present invention are waxy solids under the normal conditions and temperatures of use of condensers, and hence are advantageous in that they do not leak from between the condenser armatures during operation. Consequently, expensive container constructions necessary to prevent leakage of the dielectric material need not be employed. Physical properties of the dielectric materials such as melting points, viscosity and penetrability above the melting points, compressibility, etc., are such that the dielectric materials may be readily impregnated into condenser assemblies. This is advantageous in that it makes possible the elimination of laborious, time-consuming and hence expensive assembly procedures according to which the dielectric material is spread between the armatures which are subsequently assembled into the condensers. Despite the fact that the dielectric materials of the present invention are solids at operating temperatures they have high dielectric constants, either alone or in conjunction with other dielectric materials, such as paper or the like, which may be employed as spacers. Hence, by employing the dielectric materials of the present invention it is possible to construct condensers having a large capacity in a small space. The dielectric materials of the present invention are non-hygroscopic, chemically stable, and do not undergo electrolytic changes or decompose or break down under the conditions of use in electrical condensers, factors which make for long condenser life.

Each of the dielectric materials embodying the present invention comprises a mixture of a plurality of mononitro-dichloro isomers of xylene in solid solution. Such mixture may include such isomers of one or more of the ortho, meta or para xylenes. According to the present invention, such a mixture of the mononitro-dichloro-xylenes may have in solid solution therewith an amount of another suitable substance which lowers the temperature at which the dielectric constant of the dielectric material tends to change from a high to a low value.

The invention will be described more fully hereinafter in connection with the accompanying drawing in which:

Fig. 1 is a curve indicating the relationship of the dielectric constant to the composition for a range of mixtures of two mononitro-dichloro-orthoxylenes in solid solution;

Fig. 2 represents a roll type condenser embodying the invention; and

Fig. 3 represents to an enlarged scale a sectional elevation of a portion of two armatures and associated dielectric material of a stacked condenser embodying the invention.

The proportions and kinds of the different mononitro-dichloro-xylene isomers associated in solid solution are important in determining the properties of the resulting dielectric material. Extremely advantageous results from the standpoint of high dielectric constants over the operating range of an electrical condenser are provided when the isomers are of the kinds and in the proportions obtained as a result of a process according to which one or more xylenes are chlorinated, advantageously to approximately the dichloro level, the resulting chlorinated isomers are approximately fractionated to separate the dichloro isomers, and the dichloro-xylene isomers are nitrated to approximately the mononitro stage.

A useful mixture of isomers is obtained when this procedure is applied to a single xylene, such as a meta or ortho-xylene. However, since each of the commercial xylenes contains appreciable amounts of one or both of the other two isomers, the result of the process as applied to a single commercial xylene is a mixture of the mononitro-dichloro isomers of at least two of the ortho, metal and para xylenes in solid solution. The presence of the mononitro-dichloro isomers of the other xylenes is in general advantageous in raising the dielectric constant of the material comprising the solid solution. In general a mixture of isomers in solid solution according to the present invention has a higher dielectric constant than the individual isomers comprising the solution.

The following examples indicate procedures by which may be prepared mixtures of mononitro-dichloro-xylene isomers in solid solution embodying the present invention which are highly advantageous for use as dielectric materials for electrical condensers.

Example 1

A four-litre glass flask containing 4.85 pounds of commercial ortho-xylene was chilled in an ice bath to about 10° C. Approximately 15 grams of iron filings were added and chlorine gas passed into the flask. The reaction soon proceeded vigorously with evolution of hydrogen chloride. The temperature of the reaction mixture was maintained below about 20° C. and chlorination was continued until 6.5 pounds of chlorine had been added, this amount being theoretically required to add two chlorine atoms to each molecule of the ortho-xylene.

The resulting chlorinated solution, which contained, besides the dichloro xylenes, other chlorinated xylenes of other degrees of chlorination, was washed repeatedly, first with dilute hydrochloric acid to remove iron compounds, and then with dilute sodium hydroxide, being finally dried over anhydrous sodium sulphate. The dried liquid was fractionally distilled at atmospheric pressure through a column having the equivalent of twelve or more theoretical plates. The fraction having a boiling point up to about 210° C. was set aside for further chlorination and the fraction having a boiling point between about 210° C. and about 245° C. was redistilled. Sometimes there was considerable evolution of hydrogen chloride during the first distillation, apparently due to breakdown of addition products and side chain halogen. In such case the distillate was washed with dilute sodium hydroxide before redistillation. The material distilling between about 218° C. and about 243° C. on the second distillation was essentially a mixture of dichloro xylene isomers and was retained and used for nitration. It amounted to about five pounds. The two dichloro-ortho-xylenes produced by direct chlorination boil between about 234° C. and 240° C. However, the commercial ortho-xylene employed contained an appreciable amount of meta-xylene, the dichloro derivatives of which boil between about 220° C. and about 230° C. The presence of these compounds in the mixture was apparently beneficial rather than harmful and therefore no attempt was made to separate them.

The dichloro-xylene fraction prepared as described was nitrated in the following manner: About 200 cubic centimeters of the dichloro-xylene fraction was added in one amount to a mixture containing about 500 cubic centimeters of concentrated nitric acid and about 300 cubic centimeters of concentrated sulphuric acid, which amount of nitric acid was theoretically approximately sufficient to add one nitro group to each chlorinated xylene molecule in the fraction. The container was heated with constant shaking. It was found that if the two acids were freshly mixed, their heat of mixing was usually enough to start the nitration. The nitration reaction became slightly exothermic so that the container stayed heated due to the heat of reaction. It was found that in some cases the reaction might proceed so vigorously that it was necessary to cool the container. From time to time a sample of the oily layer was removed with a pipette and poured into cold water. When the oil became completely solid in cold water, the reaction was substantially complete. The oily layer in the container was then separated from the hot spent acid and diluted with twice its volume of heptane. The heptane solution was washed first with hot water and then repeatedly with hot dilute sodium hydroxide solution of about 2 per cent concentration. The first alkali washes took on a dark reddish brown color which became progressively lighter with succeeding washes. The operation was continued until the washed solution acquired only a light yellow color. The heptane solution was dried over anhydrous sodium sulphate while being kept hot and then filtered, cooled to about 0° C. and allowed to stand several hours. The nitro compound separated as a waxy yellow solid and was filtered off. The resulting product was recrystallized twice from heptane or light petroleum and was freed from occluded solvent by evaporation.

The resulting product was a solid solution consisting essentially of a mixture of 3-nitro, 4,5-dichloro-ortho-xylene, 5-nitro, 3,4-dichloro-ortho-xylene, and small amounts of mono-nitro-di-chloro-meta-xylenes, and had a dielectric constant and physical characteristics rendering it advantageous for use as a dielectric material, particularly in electrical condensers.

Example 2

A convenient amount of a commercial ortho-xylene, having a boiling range of about 2° C., in a suitable glass container was treated with chlorine gas, a small amount of $FeCl_3$ being present in the container as a chlorination catalyst. The temperature was allowed to raise to about 75° C. and sufficient chlorine gas was passed into the mixture until an amount theoretically sufficient to add two chlorine atoms to each molecule of the ortho-xylene was supplied.

To remove iron and other undesirable compounds the resulting solution was washed repeatedly with hydrochloric acid and with dilute sodium hydroxide, being finally dried over anhydrous sodium sulphate. The dried liquid was fractionally distilled at atmospheric pressure through a fractionation column having about twelve theoretical plates, the dichloro fraction boiling between about 210° C. and about 240° C. being used without redistillation for nitration.

A mixed acid containing by weight approximately 45 per cent nitric acid, 52 per cent sulphuric acid, and 3 per cent water was used for the nitration of this dichloro fraction in the proportion of 80 parts of acid to 100 parts of dichloro-ortho-xylene. The acid mixture was added to the chlorinated xylene and the temperature was gradually brought up to about 75° C., the mixture being held at this temperature for about one hour. The oily mixture of nitro-dichloro-xylene isomers was separated from the spent acid by pouring the reaction mixture into cold water. The oily mixture was then diluted with twice its volume of heptane, the heptane solution being washed first with hot water and then repeatedly with hot dilute sodium hydroxide solution. The alkali washing operation was continued until the wash solution acquired only a light yellow color. The heptane solution was dried over anhydrous sodium sulphate upon being heated and then filtered, cooled to about 0° C. and allowed to stand several hours. The waxy yellow solid which separated was then filtered off and was recrystallized from an equal volume of heptane at a temperature of about 12° C. The product was washed on the filter with a small amount of heptane and then air dried.

It contained a mixture of isomers similar to and in about the same proportions as those of the dielectric material produced according to the procedure described in Example 1.

*Example 3*

According to this example a mixture of mono-nitrodichloro isomers of meta-xylene was prepared by a procedure similar to that of Example 1. The chlorination was carried out as described in Example 1 to theoretically add two chlorine atoms to each xylene molecule and by fractional distillation the chlorinated meta-xylenes boiling between about 210° C. and about 235° C. were separated. This fraction was redistilled and the fraction obtained therefrom boiling between about 215° C. and about 230° C. on the second distillation was retained and used for the nitration. This fraction consisted essentially of the dichloro-meta-xylene isomers with appreciable amounts of dichloro-ortho-xylenes and dichloro-para-xylenes, due to the fact that the commercial meta-xylene employed contained appreciable amounts of the ortho- and para-xylenes.

This fraction was nitrated to the mononitro stage in accordance with the procedure outlined in Example 1. The resulting substance after separation, purification, and crystallization as described in said Example 1 was a waxy yellow solid consisting essentially of a mixture of the nitro-dichloro-meta-xylenes and appreciable amounts of the nitro-dichloro isomers of the other xylenes and having dielectric and physical characteristics rendering it advantageous for employment in electrical condensers.

Determination of the dielectric constants of the materials of Examples 1, 2 and 3 over the ordinary range of operating temperatures of electrical condensers, i. e., between about 20° C. and about 60° C. indicated that the solid solutions of nitro-dichloro-xylene isomer mixtures prepared according to said examples have excellent dielectric properties.

Determination of the dielectric constant of such a material was effected by immersing two plates of a condenser, separated by a suitable spacer to a distance of about $\frac{1}{16}$ inch, in a container having therein the dielectric material in the liquid state. After the dielectric material was cooled and solidified its dielectric constant was determined by means of a capacitance-conductance bridge, an oscillator voltage of about 25 volts and a small current being employed. Tests of the dielectric materials of the above described examples made in the frequency range between about 1 to 100 kilocycles according to this procedure indicated that over the range of normally operating temperatures of an electrical condenser, the dielectric material prepared according to the procedure of Example 1 had a dielectric constant greater than about 12, that prepared according to the procedure of Example 2 had a dielectric constant greater than about 11, and the dielectric material obtained according to the procedure of Example 3 had a dielectric constant greater than about 16.

The dielectric constants of these materials were even greater when the materials were employed in the form of pressed sheets, that is, sheets which had been subjected to a pressure of from one to two tons per square inch, as could advantageously be employed as dielectric layers without other spacers. The cause of this increase in the dielectric constant with pressure is not definitely understood.

Mixtures of nitro-dichloro-xylenes in solid solution similar to those produced according to the above examples may be obtained by mixing pure or substantially pure mononitro-dichloro-xylene isomers. For example, a mixture in solid solution comprising from about 70 per cent to about 90 per cent of 5-nitro, 3,4 dichloro-ortho-xylene with a remainder essentially of 3-nitro, 4,5-dichloro-ortho-xylene appears to be essentially equivalent to the mixture obtained according to the procedure of either Example 1 or Example 2.

The desirable dielectric constants which are provided with these proportions of the indicated nitro-dichloro-ortho-xylenes are illustrated by Fig. 1 of the drawing which shows the dielectric constants, determined as indicated above on pressed sheets formed of the indicated mixtures, for various compositions of 5-nitro, 3,4 dichloro-ortho-xylene and 3-nitro, 4,5 dichloro-ortho-xylene. Each of these isomers contained small amounts of the other isomers, due to the difficulty of removing them. Curve A indicates the dielectric constants at 25° C. for the compositions when measured as the temperature of the dielectric material in each case was ascending from a temperature below the transition range of the material, which range will be explained hereinafter. Curve B indicates the dielectric constants at 25° C. of the compositions measured with the temperature descending from a temperature above the transition range. These curves indicate that solid solutions embodying mixtures of 5-nitro, 3,4-dichloro-ortho-xylene and 3-nitro, 4,5-dichloro-ortho-xylene in the proportions of about 70 to about 90 per cent of the former with remainders of the latter provide maximum values of the dielectric constant at room temperature. Furthermore, throughout the normal operating range of temperatures, i. e., up to about 60° C. mixtures of such compositions provide the highest dielectric constants. The phase diagrams and crystalline structure of these mixtures indicate that the constitutents are in solid solution.

While the range of mixtures of the mononitro-dichloro-ortho-xylene isomers indicated above provide the most advantageous results, very desirable results are also provided when solid solutions embodying mixtures comprising from about 50 to about 95 per cent 5-nitro, 3,4-dichloro-ortho-xylene and about 5 to 50 per cent of 3-nitro, 4,5-dichloro-ortho-xylene are employed, since mixtures of these isomers falling within this range have higher dielectric constants than either of the isomers itself, as is apparent from inspection of the curves of Fig. 1.

As is apparent from Fig. 1, the dielectric constant for a given composition at about 25° C. is dependent upon whether the temperature of the composition is increasing from below or decreasing from above the transition range. The dielectric constant of each of said compositions also varies with the temperature of the composition.

Each of these, as well as other, mixtures embodying the invention has a transition range, or temperature range through which the dielectric constant of the mixture in the solid solution state abruptly changes from a very low value to a high value as the temperature increases, and also abruptly changes from a high value to a low value as the temperature decreases.

The 5-nitro, 3,4-dichloro-ortho-xylene isomer itself while in the solid state has a transition range within the range of operating temperatures encountered in the use of electrical condensers. That is, as the temperature of this xylene isomer is raised from below room temperature an abrupt increase in the dielectric constant occurs, the dielectric constant increasing from a value of about 5 to about 22 within the temperature range of about 20° C. to about 60° C., while when the temperature is decreased a very abrupt drop in dielectric constant from the high to the low value occurs at a temperature of about 30° C. The 3-nitro, 4,5-dichloro-ortho-xylene has no transition range in the solid state, its dielectric constant remaining low, in the neighborhood of 3, while it is in the solid state. However, each solid solution containing the 5-nitro, 3,4-dichloro-ortho-xylene and the 3-nitro, 4,5-dichloro-ortho-xylene in proportions falling within the range embraced by the invention has a dielectric constant higher than each isomer individually and a transition range which is shifted to lower temperatures. Indeed, in such solid solutions the temperatures at which the values of the dielectric constant change from high values to such low values and vice versa are out of the ordinary range of operating temperatures of electrical condensers. For example, formation of a solid solution containing in addition to 5-nitro, 3,4-dichloro-ortho-xylene about 30 per cent by weight of 3-nitro, 4,5-dichloro-ortho-xylene causes the transition range to shift more than 20° C. lower than that of the 5-nitro, 3,4-dichloro-ortho-xylene itself and hence out of the usual operating range of electrical condensers.

The solid solutions obtained by the processes outlined above also provide similar advantages since the mixture of isomers in the solid solution provides higher dielectric constants than any of the isomers individually, and since such mixture of isomers in solid solution results in shifting of the transition range to lower temperatures out of the usual operating range of electrical condensers.

Apparently the high dielectric constants of the solid solutions of the present invention arise because the molecules of the materials of the invention, which are polar because of the presence and positions of the nitro and chloro groups, are permitted to rotate under the influence of an electric field even though such materials are solid. The accepted theory that polar molecules which are rotatable in response to an electric field provide high dielectric constants is well explained in Smyth's book entitled "Dielectric Constant and M l lar Structure" (1931 Chemical Catalog Company, New York). Polar molecules are molecules which, due to their molecular structure have an unsymmetrically distributed electrostatic charge so that each of these molecules possesses a positive and negative electrostatic pole separated from one another by a finite distance. When a potential is applied across a body containing such molecules, there is a tendency for the molecules, due to their electrostatic polarity, to rotate and orient themselves so that the positive pole faces the negative source of potential while the negative pole faces the positive source of potential in much the same manner as a permanent magnet rotates and orients itself in an electromagnetic field. If the molecules are capable of rotation under such conditions a substantial orientation of them will occur. The net effect is a considerably increased capacitance between the two plates.

Solid substances which have polar molecules which are substantially geometrically symmetrical about the molecule center of gravity usually have relatively high dielectric constants since it appears that their molecules are capable of rotation when subjected to an electrostatic field, the degree of symmetry and the degree of polarity determining the possibilities of molecular rotation in the solid state. The tendency for the polar molecules to rotate must be sufficient to overcome the forces tending to hold the molecules in the crystalline structure of the solid material, such forces being largely determined by the degree of asymmetry of the molecules.

Certain of the isomers employed in solid solution according to the present invention have molecules of such a degree of polarity and geometrical symmetry that they will rotate in the solid state either at room or at moderately elevated temperatures. An example of such a substance is 5-nitro, 3,4-dichloro-ortho-xylene which has a high dielectric constant at moderately elevated temperatures indicating that it has molecular rotation at such temperatures. In this case elevation of the temperature reduces the intermolecular forces resisting molecular rotation to such extent that the tendency of the polar molecule to rotate in an electrostatic field predominates, wherefore, as indicated above, the substance has a transition range and a high dielectric constant above said range. The other isomer, 3-nitro, 4,5-dichloro-ortho-xylene, on the other hand does not tend to rotate in the solid state even at elevated temperatures, since the tendency of its molecules to rotate is not sufficiently greate to overcome the crystalline forces resisting rotation. The increase of the dielectric constant of a mixture of these two isomers in solid solution falling within ranges indicated above over the dielectric constant of either of the individual isomers apparently arises because the lattice parameters of the crystals are expanded in the solid solution. Such expansion of the lattice parameters apparently results in an associated reduction in the magnitude of the forces opposing rotation of the molecules, so that in a solid solution of the 5-nitro, 3,4-dichloro-othoxylene and 3-nitro, 4,5-dichloro-ortho-xylene in proportions falling in the range indicated above, the molecules of both substances rotate even though the molecules of one of the individual isomers do not rotate.

It appears that all solid solutions of nitrodichloro-xylene isomers prepared according to the processes indicated above have high dielectric constants for similar reasons.

According to the present invention the temperature range in which the dielectric constants of the solid solutions of the invention embodying mixed mononitro-dichloro-xylene isomers change from high to low values and vice versa may be lowered considerably by the addition of a minor proportion of one or more suitable substances. In general such a substance may be a carbocyclic polar compound, i. e., having carbocyclic molecules having cyano, amino, halogen, hydroxy or nitro radicals connected thereto, which have a high degree of symmetry about their geometrical centers of gravity and which are capable of entering into a solid solution with at least one of the nitro-dichloroxylene isomers. Penta and hexa substituted benzene compounds in which at least one of the substituents is a polar group are satisfactory. Examples of such materials are dinitro - prehnitene, dichloro - prehnitene, penta-methyl-chloro-benzene, dichloro-isodurene, trichloro-hemimellithene, dinitro-isodurene, trichloro-pseudocumene, tetrachloro - meta - xylene, tetrachloro-ortho-xylene, pentachloro - toluene, penta - methyl - fluoro - benzene, tetrachloro - meta - fluorotoluene, 2,3,5-trichloro - meta - xylene, 4,5,6 - trichloro - ortho - xylene, and 2,4,6-trichloro-meta-fluoro-toluene.

Although the molecules of such added substances are polar, they may or may not rotate in the solid state when such substances are individually subjected to an electrostatic field. In dinitro-prehnitene, for example, the molecules do not rotate until the temperature is over about 80° C.

In general, advantageous results in shifting the transition range to a lower temperature are provided by the addition to a mixture of nitro-dichloro-xylene isomers embodying the invention from about 10 to about 30 percent of such added substance, such as dinitro-prehnitene, based on the weight of the mixture of the isomers, and putting all of said ingredients in solid solution.

Thus, this amount of dinitro-prehnitene added to the mixture of isomers produced according to each of Examples 1, 2 and 3 produced desirable results in elevating the dielectric constant and lowering the transition range. More specifically, a solid solution containing, in addition to the mixture of isomers produced in accordance with the process of either Example 1 or Example 2, about 20 per cent by weight of such mixture of dinitro-prehnitene, was found to be extremely advantageous since its dielectric constant was higher than before the addition of dinitro-prehnitene and since its transition range was lowered until it lay well below 0° C. on both ascending and descending temperatures. Similar results were obtained when a like amount of dinitro-phehnitene was added in solid solution to the mixture of isomers produced in accordance with the process of Example 3.

When solid solutions were formed containing from about 10 to about 30 per cent of dinitro-prehnitene and a mixture containing from about 70 to about 90 per cent of 5-nitro, 3,4-dichloro-ortho-xylene and about 30 to about 10 per cent of 3-nitro, 4,5-dichloro-ortho-xylene results were obtained similar to those obtained when like amounts of dinitro-prehnitene were added to the products of the processes of Examples 1 and 2. As a specific example, a mixture of approximately 55 per cent of 5-nitro, 3,4-dichloro-ortho-xylene, 25 per cent of 3 nitro, 4,5-dichloro-ortho-xylene and 20 per cent of dinitro-prehnitene in solid solution was found to have advantageous dielectric properties since it had a high dielectric constant and low transition range, well below the ordinary operating temperatures to be expected.

From the above it is apparent that the presence of a substantial proportion of 5 nitro, 3,4-dichloro-ortho-xylene in solid solution with one or more other constituents, the molecules of which do not rotate or rotate only slightly to orient themselves in an electrostatic field is beneficial in spreading the lattice parameters of the crystals and substantially increasing the dielectric constant.

The dielectric materials of the present invention are solid waxy substances over the range of operating temperatures of electrical condensers and have high dielectric constants. As indicated above they may be employed in electrical condensers which may or may not have spacers between the armatures. In Fig. 2 is shown one form of electrical condenser embodying the present invention. In the condenser of said figure sheets 1 and 2 of a porous dielectric, such as paper, impregnated with a dielectric material comprising a solid solution embodying the invention are interposed between the metal foils 3 and 4. The impregnated dielectric sheets 1 and 2 and the foils 3 and 4 are shown as spirally wound in the form of a condenser 5. Two metallic strips 6 and 7 electrically connected to the foils 3 and 4 form the terminals of the condenser. In the embodiment of Fig. 3, which shows to a greatly enlarged scale a portion of two armatures of a stacked condenser, the armatures 8 and 9 are shown as coated with layers 10 of a dielectric material embodying the present invention, no spacers being employed although it is apparent that such spacers may be employed in such a condenser.

The dielectric materials of the present invention may also be employed in other electrical apparatus for which their electrical and physical characteristics render them useful. Various modifications may be made in the illustrated embodiments of the invention and in the methods of producing the materials embodying the invention.

It is intended that the patent shall cover, by suitable expression in the appended claims, whatever features of patentable novelty reside in the invention.

What is claimed is:

1. A solid solution of a mixture of nitro-dichloro-xylene isomers having the composition of the mixture of isomers obtained by chlorination of a xylene to approximately the dichloro stage, fractionation of the resulting mixture of chlorinated xylene isomers to obtain a fraction consisting essentially of a mixture of the dichloro-xylene isomers, and nitration of said fraction to approximately the mononitro stage.

2. A solid solution of a mixture of nitro-dichloro-xylene isomers having the composition of the mixture of isomers obtained by chlorination of meta-xylene to approximately the dichloro stage, fractionation of the resulting mixture of chlorinated xylene isomers to obtain a fraction consisting essentially of a mixture of the dichloro-meta-xylene isomers, and nitration of said fraction to approximately the mononitro stage.

3. A solid solution of a mixture of nitro-dichloro-xylene isomers having the composition of the mixture of isomers obtained by chlorination of ortho-xylene to approximately the dichloro stage, fractionation of the resulting mixture of chlorinated xylene isomers to obtain a fraction consisting essentially of a mixture of the dichloro-ortho-xylene isomers, and nitration of said fraction to approximately the mononitro stage.

4. In an electrical device, a dielectric element comprising in solid solution a mixture of nitro-dichloro-xylene isomers having the composition of the mixture of isomers obtained by a process comprising chlorination of a xylene to approximately the dichloro stage and nitration of the resulting mixture of dichloro-xylene isomers to approximately the mononitro stage.

5. In an electrical device a dielectric element comprising in solid solution a mixture of nitro-dichloro-xylene isomers having the composition of the mixture of isomers obtained by chlorination of a plurality of xylenes to approximately the dichloro stage, fractionation of the resulting mixture of chlorinated xylene isomers to obtain a fraction consisting essentially of a mixture of the dichloro-xylene isomers, and nitration of said fraction to approximately the mononitro stage.

6. In an electrical device a dielectric element comprising in solid solution a mixture of nitro-dichloro-xylene isomers having the composition of the mixture of isomers obtained by chlorination of a xylene to approximately the dichloro stage, fractionation of the resulting mixture of chlorinated xylene isomers to obtain a fraction consisting essentially of a mixture of the dichloro-xylene isomers, and nitration of said fraction to approximately the mononitro stage.

7. An electrical condenser comprising two spaced armatures formed of electrically conductive material having therebetween a dielectric element comprising in solid solution a mixture of nitro-dichloro-xylene isomers having the composition of the mixture of isomers obtained by chlorination of a xylene to approximately the dichloro stage, fractionation of the resulting mixture of chlorinated xylene isomers to obtain a fraction consisting essentially of a mixture of the dichloro-xylene isomers, and nitration of said fraction to approximately the mononitro stage.

8. Electrical apparatus comprising two electrically conductive elements separated by a solid dielectric element comprising in solid solution a mixture of nitro-dichloro-xylene isomers having the composition of the mixture of isomers obtained by chlorination of meta-xylene to approximately the dichloro stage, fractionation of the resulting mixture of chlorinated xylene isomers to obtain a fraction consisting essentially of a mixture of the dichloro-meta-xylene isomers, and nitration of said fraction to approximately the mononitro stage.

9. An electrical condenser comprising two spaced armatures formed of electrically conductive material having therebetween a dielectric element comprising in solid solution a mixture of nitro-dichloro-xylene isomers having the composition of the mixture of isomers obtained by chlorination of meta-xylene to approximately the dichloro stage, fractionation of the resulting mixture of chlorinated xylene isomers to obtain a fraction consisting essentially of a mixture of the dichloro-meta-xylene isomers, and nitration of said fraction to approximately the mononitro stage.

10. Electrical apparatus comprising two electrically conductive elements separated by a solid dielectric element comprising in solid solution a mixture of nitro-dichloro-xylene isomers having the composition of the mixture of isomers obtained by chlorination of ortho-xylene to approximately the dichloro stage, fractionation of the resulting mixture of chlorinated xylene isomers to obtain a fraction consisting essentially of a mixture of the dichloro-ortho-xylene isomers, and nitration of said fraction to approximately the mononitro stage.

11. An electrical condenser comprising two spaced armatures formed of electrically conductive material having therebetween a dielectric element comprising in solid solution a mixture of nitro-dichloro-xylene isomers having the composition of the mixture of isomers obtained by chlorination of ortho-xylene to approximately the dichloro stage, fractionation of the resulting mixture of chlorinated xylene isomers to obtain a fraction consisting essentially of a mixture of the dichloro-ortho-xylene isomers, and nitration of said fraction to approximately the mononitro stage.

12. Electrical apparatus comprising two electrically conductive elements separated by a solid dielectric element comprising in solid solution a mixture of nitro-dichloro-xylene isomers having the composition of the mixture of isomers obtained by chlorination of a xylene to approximately the dichloro stage, fractionation of the resulting mixture of chlorinated xylene isomers to obtain a fraction consisting essentially of a mixture of the dichloro xylene isomers, and nitration of said fraction to approximately the mononitro stage; and with said mixture a minor proportion of dinitroprehnitene.

13. In an electrical device a dielectric element comprising in solid solution a mixture of 5-nitro, 3,4-dichloro-ortho-xylene and 3-nitro, 4,5-dichloro-ortho-xylene in which the 5-nitro, 3,4-dichloro-ortho-xylene constitutes from about 50 to about 95 per cent of the weight of said mixture of nitro-dichloro-xylenes.

14. In an electrical condenser, a dielectric element comprising in solid solution a mixture of 5-nitro, 3,4-dichloro-ortho-xylene and 3-nitro, 4,5-dichloro-ortho-xylene in which the 5-nitro, 3,4-dichloro-ortho-xylene constitutes from about 70 to about 90 per cent of the weight of said mixture of nitro-dichloro-xylenes.

15. Electrical apparatus comprising two electrically conductive elements separated by a solid dielectric element comprising in solid solution a mixture of nitro-dichloro-ortho-xylenes essentially consisting of from about 50 to about 95 per cent of 5-nitro, 3,4-dichloro-ortho-xylene and from about 50 to about 5 per cent of 3-nitro, 4,5-dichloro-ortho-xylene and, with said mixture, a minor proportion of dinitro-prehnitene.

16. Electrical apparatus comprising two electrically conductive elements separated by a solid dielectric element comprising in solid solution a mixture by weight of about 55 per cent of 5-nitro, 3,4-dichloro-ortho-xylene to about 25 per cent of 3-nitro 4,5-dichloro-ortho-xylene, and about 20 per cent of dinitro-prehnitene.

BURNARD S. BIGGS.
ADDISON H. WHITE.
WILLIAM A. YAGER.